Oct. 8, 1968 E. J. ZAHN 3,404,577

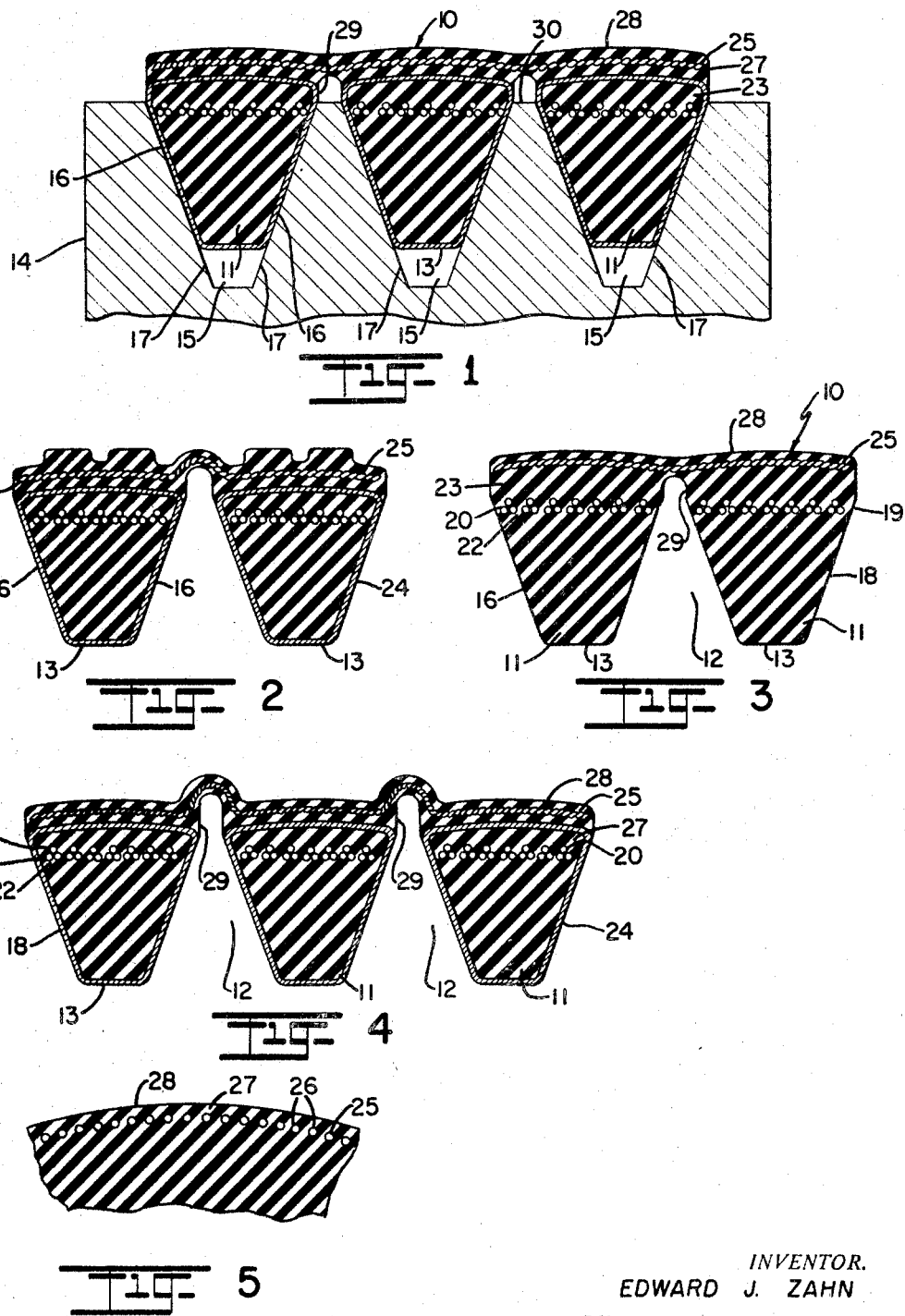

POWER TRANSMISSION BELT

Filed July 18, 1966 2 Sheets-Sheet 2

INVENTOR.
EDWARD J. ZAHN
BY
ATTORNEY

United States Patent Office 3,404,577
Patented Oct. 8, 1968

3,404,577
POWER TRANSMISSION BELT
Edward Joseph Zahn, Denver, Colo., assignor to The Gates Rubber Company, Denver, Colo., a corporation of Colorado
Filed July 18, 1966, Ser. No. 565,775
15 Claims. (Cl. 74—229)

ABSTRACT OF THE DISCLOSURE

A power transmission belt characterized by a tie-band material connecting a plurality of trapezoidal section belts into a unitary structure in order to allow a multiple power transmission belt drive such that the belts coact to perform as a unitary belt structure for the transmission of power but allowing sufficient degrees of freedom to each individual belt to accommodate its own wedging action in individual grooves with which the belts coact.

---

This invention relates to improvements of power transmission belts and more particularly, to power transmission belts designed to operate in conjunction with multiple groove sheaves. The belt is especially adapted for use in heavy duty applications wherein because of the particular characteristics of the drive, vibrations and whipping action may be imparted to the power transmitting element. As can be perceived when such vibrations are imparted to a drive wherein a plurality of belts are utilized to transmit the power, the vibration can cause the belts to turn over or may cause the belt to whip thereby throwing off adjacent belts.

Some cases of prior art describe variations in tying together a number of belts in order to operate in unison over a sheave having multiple grooves. In spite of these disclosures, there is a remarkable lack of any successfully commercial adaptation of these disclosures. One reason is that when such belts are tied together according to the prior art, they are done so in such a manner as to require the entire belt to act as a unit component. In reality, therefore, the belt lost all of the advantages of each unit operating as a V-type transmission belt with each supplying its own wedging action in order to transmit the maximum amount of power. The net result was that the multiple drive was converted to a flat drive merely having guiding grooves. Consequently, this invention covers a particular design mechanism for tying the individual belts together in a manner to retain the advantages of single V-belts, but yet unifying the elements to act as a single power transmission drive.

Another attributing measure which might have led to the absence of a commercially successful belt, in spite of the teaching of the prior art, is that perhaps too much latitude was given in tying the belts together. Each belt, therefore, acted in its own individual manner with no successful method of coordinating the belts. Perhaps this approach was the wisest one in that it is certainly more desirable to retain the wedging action of each belt independently of the other even if the belts cannot be coordinated. On the other hand, one must have some degree of unity in order to prevent the belts from interacting with one another in a detractive mechanical manner thereby reducing the efficiency of any one driving unit. Generally, what happened with belts of this design was that eventually the belts would separate and indeed act as individual units.

In the present invention there has been found a successful method of tying the belts together to coact and transmit as a unit without detracting mechanically from the advantages of the multiple drive. On the other hand, enough independence of the belts remains such that the mechanical features have not been destroyed to the extent that the belt has become and acts merely as a guided flat belt.

It is therefore an object of this invention to impart features which allow an integration of the belt to operate as a coordinated unit while maintaining all of the desirable features of multiple belt drives of the V-type.

It is another object of this invention to incorporate a power transmission drive having independent V-type driving action and yet prevent independent whipping or vibration of the belts thereby eliminating the possibility of one or more of the belts turning or rotating in the sheave thereby throwing the belt off of the sheave.

The present invention comprises improvements in construction and design whereby the individual belts are tied together with a tie-band having cords in an elastomeric gum material. The cords are placed substantially perpendicular to the direction of travel of the belts. The cords have a modulus great enough to tie the belts together in order to travel as a unit around the sheave and yet have a modulus low enough to allow the belts to act independently of one another in order to accommodate themselves for sheave eccentricity, out-of-round and dimensional variations. Additionally, there is provided a sufficient degree of clearance between the land of the sheave between the grooves and the bottom of the tie-band to accommodate belt seating and groove wear. There is further provided a vertical flat portion between adjacent belts in order to provide the necessary degree of clearance such that the modulus of the tie-band alone is not depended upon to provide freedom between the belts to accommodate all inaccuracies of the sheave. As is so often the case with drives of this particular type, foreign elements such as rocks and cinders will lodge themselves between the land of the sheave and the bottom of the tie-band. Sufficient clearance is given to allow such foreign material to travel around the sheave without adversely affecting the tie-band. It has been found that the modulus of the tie-band material is of a rather critical nature as is the clearance between the land 29 of the sheave and the bottom of the tie-band 25. Both of these factors are completely lacking in the prior art. Yet the provision of these factors allows for a belt which has been found to be particularly well adapted for power transmission drives likely to encounter severe shock loading and vibration characterisics.

Further objects and advantages within the scope and comprehension of this invention will be apparent from the following description and reference to the annexed drawings in which:

FIG. 1 is a cross section of a multiple groove sheave and a belt embodying the principles of my invention showing the operative combination therebetween;

FIGURE 2 is a cross section of a modification of the belt having longitudinal arcuate ribs between the belts and longitudinal flat ribs between the arcuate ribs;

FIGURE 3 is a cross section of the preferred embodiment of the belt in which there is no band cover around the individual belts;

FIGURE 4 is a cross section similar to FIGURE 3, but in which the embodiment has only longitudinal arcuate ribs between the belts;

FIGURE 5 is a longitudinal section through one of the belts; and

Figure 6:
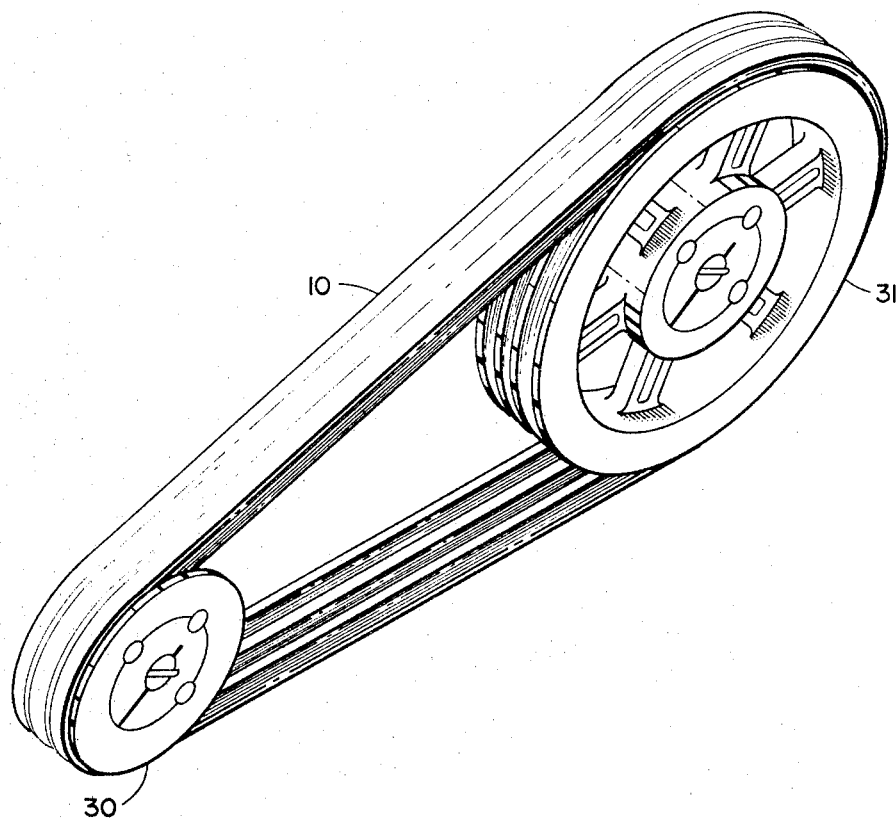
FIGURE 6 is a perspective view showing the configuration and relationship of a belt embodying the principles of this invention operating under a driving and a driven sheave.

As seen from the figures, a belt 10 embodying the principles of this invention has laterally spaced ribs 11 passing longitudinally around the inner circumference of the belt. The ribs 11 are separated by laterally spaced grooves 12. Generally the ribs of the belt are truncated at the bottom portion by a side 13 which is substantially parallel to the top of the belt. When such a belt 10 is used in a sheave 14 having a plurality of grooves 15, the driving surfaces 16 of the ribs 11 engage the driving surfaces 17 of the grooves 15 of this sheave 14.

A typical embodiment of the belt 10 comprises a compression section 18 which is composed by standard high modulus stock such as loaded gum or fiber reinforced rubber. Immediately above the compression section 18 is the neutral axis 19 in which is placed tensile members 20. The tensile members generally are a plurality of longitudinally spaced cords embedded within overcord 21 and undercord 22 which act as a supporting member for the tensile members 20. The cords 20 may be of cotton, rayon, nylon, polyester, wire, or any other suitable material depending upon the characteristics necessary for transmitting the power. The overcord 21 and undercord 22 is generally a gum rubber suitably loaded with fiber or other reinforcing material in order to provide the necessary degree of support of the cords 20. It should be realized that throughout this invention whenever the term "rubber" is used, it refers to natural or synthetic rubber or rubberlike compounds normally used in the V-belt art. The synthetic rubbers may include such materials as styrene-butadiene butadiene-acrylic, nitrile copolymers, polychloroprenes, polyurethanes, polybutadiene, polyisoprene, or blends of these materials with each other or with natural rubber.

In this particular embodiment of this invention, there is immediately over the overcord 21 a tension section 23. The entire belt may be covered with a band 24 of suitable material such as rubberized fabric in order to protect the belt. The above components are generally present in all typical V-belts. The embodiment of this invention is culminated in a tie-band 25. The tie-band 25 comprises a plurality of special modulus cords 26 running in a direction transversely to the belts and substantially perpendicular to the direction of travel of the belts. The cross cords 26 are generally embedded in a gum rubber section 27 and are further topped by a gum cover 28. One of the two elements of invention resides in the particular physical characteristics of the tie-band 25 as determined by the treatment and choice of material of the cross cords 26. Thus, it has been found that the tie-band 25 must act to unite the individual ribs 11 of the belt 10 and yet allow the ribs to accommodate inaccuracies in the demension of the sheave. The inaccuracies result either from sheave wear, seating or from manufacturing procedures. Each rib 11 of the belt 10 must be allowed to act independently in order to accommodate its own seating in the groove 15 of the sheave and to allow the best possible wedging action of each individual belt such that there is a most effective driving action between the side 16 of the belt and the driving side 17 of the sheave.

Suitable material of the cross cords 26 is chosen and specially treated such that there is a cure shrinkage of preferably less than 0.5%, but yet which must have a transverse extensibility of at least 1% when subjected to a lateral pulling force of 100 pounds per linear inch. Perhaps this is more correctly expressed as a measure of the transverse modulus of the tie-band 25. Thus, if the tie-band were subjected to a lateral force and the strain or deformation of the tie-band in the transverse direction were carefully recorded, one would get a ratio of the stress to the strain. This ratio defines the tangent of the slope or transverse modulus of the tie-band. It has consequently been discovered that the modulus as defined by the tangent of the slope must be at least 100 but less than 2,500. The modulus along any particular section of a single belt, however, must be fairly uniform in order that the belt may unitarily operate with fairly constant characteristics.

A specific example is given for a fabric for incorporation into the belt as the tie-band component. A griege or untreated fabric consisting of cords comprising two strands of nylon with the cord having a diameter of 0.023 inch would exhibit a thermal force of from 16 to 17 pounds per inch of width. This thermal force is approximatel 6 pounds for each cord. The cure shrinkage of the greige fabric of this construction is 3.0%. After treatment of this fabric by first dipping the fabric in a resorcinol/formaldehyde solution, the fabric is dried at 400° F. for 60 seconds with a force of 0.05 gram per denier applied to the fabric. A cord treated in such a manner then shows a cure shrinkage of 0.5%. The thermal force per inch of width is reduced to 11 pounds which is equivalent to a thermal force of 0.4 pound per cord. From this data it can be seen that the treated fabric shows a suitable extensibility allowing for a degree of latitude for conforming to irregularities of the sheave while still showing a proper degree of force necessary to retain the overall shape of the tie-band. Thermal force is defined as that amount of pull that a cord will develop in a 11.50 inch length of cord heated to 300° F. Of course, it is understood that materials other than nylon can be used for the tie-band. Depending on the particular characteristics of the specific material, one or more strands may be necessary to form the cord of the tie-band.

Perhaps more should be said concerning the treatment of the tie-band material in order to obtain a tie-band having the required transverse modulus. It was stated that according to the material chosen, specific treatment would be necessary in order to obtain the desired characteristics. Basically one must obtain a thermally stable textile material for the lateral support since fairly uniform dimensional characteristics are necessary to support the belts as they are tied together. On the other hand, a moderate degree of extensibility is necessary to accommodate irregularities due to eccentricities of the sheaves or to sheave grooves which are irregularly worn. The tie-band essentially is composed of a plurality of parallel cross cords immediately adjacent to the next cord, all of which lie in the same direction, essentially 90° to the direction of travel of the belt. The tie-band acts as a unit. In order to obtain uniform material having the necessary characteristics, the tie-band is allowed no more than a 1% shrinkage in the transverse direction during the time that it is subjected to the elevated curing temperature of the belt. Testing has shown that the ideal cure shrinkage should be around 0.5% to be within the allowable tolerance of the belt.

As the tie-band cord shrinks during the curing process, it builds up a thermal force per unit inch of belts along the transverse direction. This thermal force is due to the contraction of the cord since the cord material will tend to shrink at an elevated temperature. This thermal force ideally should be no greater than 20 pounds per linear inch at a temperature of 300° F. In spite of the low degree of thermal shrinkage the cured product must have a lateral extensibility of greater than 1% when subjected to a lateral force of 100 pounds per inch. It is felt that an extensibility of less than 1% will not allow for the belt to conform to the irregularities of the sheaves. All of this is best stated, however, in terms of the transverse modulus as indicated above.

It is thus felt that the transverse modulus is of prime importance. Another method has been found in order to allow the necessary degree of transverse modulus. This is by the manner indicated in FIGURE 4. It will be noted that immediately above the rib portion of the sheave corresponding to the groove portion of the belt, the tie-band assumes an arcuate configuration. At this particular area the tie-band is radiused in an outward direction away from the sheave. This, in effect, allows for overcoming two difficulties. Immediately it will be seen that the tie-band has a built-in allowance for attaining the minimum amount of transverse modulus, namely 125 pounds per square inch in the transverse direction. One must, however, still maintain the necessary degree of rigidity in order to prevent the belts from riding too independently from one another. The belt must still act as a unit. In reality, one is allowing for irregularities of sheave dimension eccentricities of the sheave and wearing of the sheave grooves and this degree of transverse freedom is to accommodate all of these irregularities. One, however, must maintain the transverse support and characteristic to assume that the belt will act as a unit. In order, however, to obtain the greatest degree of efficiency, each individual belt must be allowed to seat itself fully and transmit the greatest degree of horsepower due to the wedging action of the belt into the sheave groove.

It was mentioned that the arcuate top belt, as shown in FIGURE 4, in essence accomplishes a second purpose. The second purpose was previously mentioned with the first type of belt. It is necessary that one builds into the belt a design feature to allow adequate clearance between the top of the sheave rib and the bottom of the tie-band during all periods of operation of the belt. In other words, one may have an adequate clearance with a new drive. However, as the sheave groove wears down, there is less clearance. Thus, if a belt has an anticipated life of 5,000 hours, one must allow for sheave groove wear and a consequent smaller clearance between the sheave rib and the bottom of the tie-band.

Sometimes lack of clearance is due not only to wear, but to the irregularities of the sheave itself. Other times, especially in the type of application for which this belt is well adapted, as in a rock crusher, actual particles of material will become lodged between the top of the sheave rib and the tie-band. There is no degree of difficulty if the foreign material tops through the tie-band in isolated areas. However, it is obvious that one must not allow the ribs of the sheave itself to top out through the tie-band due to the irregularities of the sheave. If this were allowed to happen, then the tie-band would be severed and the belts would separate.

Actually, the factors that must be considered in determining proper clearance between the top of the sheave and the tie-band provide a complex consideration. It is one that is not easily resolved and is therefore based upon experience and contemplated effects. Certainly the maximum tension that might be applied to the sheave would effect the depth to which the belt would seat in the sheave. Consequently, in a given size belt if one were to experience only 25 pounds tension on the tight side of the belt, there would be far less seating than if one were to apply, for instance, 400 pounds of tight side tension. The difference conceivably could be as great as 0.020 of an inch. Another factor that should be considered is the tolerance of the width of the face 30 of the rib on a particular sheave. If one were on the wide side of the tolerance, then a greater clearance between the sheave and the tie-band would result. On the other hand, if one were on the wide side of the tolerance of the groove 15 of the sheave, the belt would seat deeper into the sheave and would have less clearance.

As the belt underwent constant revolution around the sheave at a continued tension accompanied by shock loads and surge powers, the amount of clearance would be decreased by a seating of the belting during its lifetime. A good portion of this deeper seating results from actual sheave groove wear during application of the power transmission drive. Another factor that must be considered is the amount of clearance that must be provided at the time that the belt is installed to insure provision of adequate clearance during the normal life of the belt without topping out or having the face 30 of the sheave extend into the tie-band 25 of the sheave. All of these factors must be considered. Experience and mathematical consideration indicate that as much as 0.100 inch clearance must be provided in some drives depending on the tight side tension and the size of the belt. Generally, however, a clearance of 0.080 inch would be sufficient to accommodate most normal drives.

It has been found that the best manner of providing for adequate clearance is to incorporate a vertical flat portion 29 on the portion of the belt immediately below the tie-band and between each belt rib. This is done between each belt and actually a vertical clearance is provided which is coextensive with the top of each of the sheave ribs. Actually, a far smaller degree of clearance would be provided if instead of providing the vertical land 29, the sides of the belts were allowed to continue in a convergent direction to each other in the form of an inverted V. Thus, the clearance between the top of the rib of the sheave and the bottom of the tie-band assumes a rectangular cross section with the top side radiused in an outward direction rather than a triangular cross section. In this manner, the ultimate degree of clearance is allowed, and it has been discovered that this one feature provides as much toward the success as the careful maintenance of the characteristics of the tie-band alone.

It is therefore obvious how the arcuate top belt allows even a greater degree of clearance since the cross section of the clearance between the belt and the top of the sheave rib has an upper radiused side substituted for the substantially horizontal side of the first species.

The arcuate configuration also provides for a hinge line or a flexing line which provides some greater degree of accommodation of the belt to sheave irregularities. It cannot be overemphasized that even though the belt must be adequately tied together in order to eliminate individual turning over of the belt or individual vibration of the belt, that each belt must also be allowed to operate more or less independently within the sheave to a degree great enough to allow a maximum degree wedging, but to prevent the belts from interacting against one another in an adverse manner.

Another version of the arcuate top belt is indicated by FIGURE 2 wherein longitudinal ribs are provided between the arcuate section of the tie-band. These longitudinal ribs do not affect the transverse extensibility of the tie-band since they are generally formed of a rubber composition. However, it does provide for a feature which is desirable when a back-side idler is run on the belt. The back-side idler of course bears down on the top surface of the tie-band in order to provide a means of taking up excessive slack or to provide a greater degree of tension in the belt. The back-side idler may also be an additional means for controlling the vibration of the belt itself. In order to provide a more stable surface on which the back-side idler may ride, the longitudinal ribs between the arcuate sections are provided with an essentially flat or horizontal outer surface. It is interesting to note that not only does the configuration of the ribs provide for a more stable surface, but because there is area for deformation of the rib between the longitudinal upper ribs and because the ribs are of a somewhat softer material than the other portions of the belts, the ribs themselves may absorb stresses being transmitted through the back-side idler.

It has been found that for certain abrasive types of applications, it is helpful to encompass the entire belt with a covered sheath or band material 24 of a suitable material which exhibits the greatest degree of abrasion resistance. This will prevent pitting and tearing of the compression member and will tend also to protect the tensile member from becoming dislodged from the body portion of the belt. A suitable band material 24 is described in United States Letters Patent No. 2,519,590 which describes a "bias-cut" cover in which the cover comprises an exposed woven fabric in which the warped and weft threads are disposed at an angle greater than 47.5°, but less than 75° to the longitudinal axis of the belt. It has been found that a cover of this configuration retains excellent flexibility, but yet provides good protection to the compression and tension sections of the belt.

Since this particular type of belt is generally associated with rather large horsepower requirements, it is desirable to design the belt to encompass as much support as possible to keep the belt from tending to seep into the sheave into the center while hanging to the sides at the edge portions. Some belts will tend to do this under heavy horsepower loading, and consequently assume a curved configuration of the tensile portion in such a manner as to curve toward the bottom of the sheave. This, of course, is undesirable since there is an unequal load distribution on the various tensile members. One method that has been employed to overcome this type of difficulty is to design the top of the belt with an arched top such that the top is radiused outwardly in relation to the axis of the sheave. This arched top tends to give increased support to the tensile members and resists any force which tends to pull the tensile member toward the bottom of the sheave.

From the foregoing, it can be readily comprehended that the belt of my invention does, in reality, allow for the maximum degree of wedging in order to attain the utmost degree of efficiency of each power transmission belt. On the other hand, the belt operates as a unit and prevents individual belts from flipping out or turning over or forcing adjacent belts to become dislodged from the sheave. There is accordingly a uniformity in the belts and is a remarkable degree of control by the transverse tie-band. There is, however, also enough flexibility to allow for adequate clearance between the top of the ribs of the sheave and the bottom of the tie-band and to allow irregularities due to wear of the sheave variations in sheave tolerance and wear of the belts. These features allow for a distribution of the load to an even degree and will not only allow for the irregularities of the sheave but will provide for even wear and longer life.

Accordingly, the foregoing detailed description has been given for the purposes of illustration only and is not intended to limit the scope of the present invention which is to be determined from the appended claims.

I claim:

1. A belt for the transmission of power comprising: a plurality of spaced-apart endless trapezoidal sections; a tie-band connecting the tension section of each individual trapezoidal section, said tie-band comprising a plurality of cords in an elastomeric body, said cords placed at substantially a 90° angle to the longitudinal direction of the power transmission belt and said cords having a cure shrinkage of less than 1.0% and said tie-band having a transverse extensibility of at least 1% when subjected to a lateral force of 100 pounds along a 1-inch strip of said tie-band.

2. A belt according to claim 1 in which the cure shrinkage is substantially 0.5%.

3. A power transmission belt having upper tension sections, lower compression sections and an intermediate neutral axis comprising: a plurality of spaced-apart endless trapezoidal sections; a reinforcing tie-band comprising a plurality of cords embedded in an elastomeric body with the cords at substantially 90° to the longitudinal direction of said power transmission belt, said tie-band integrally connecting the top surface of said trapezoidal sections; a vertical flat portion separating each of said trapezoidal sections and extending at one end from the bottom surface of said tie-band and terminating at the other end at least at the tension section of the belt.

4. A belt according to claim 3 in which the tie-band is comprised of individual cords.

5. A belt according to claim 3 in which the tie-band is a fabric.

6. A belt according to claim 3 in which the trapezoidal sections of the belt are banded with at least one ply of fabric.

7. In a power transmission belt comprising: a plurality of separate spaced-apart endless trapezoidal sections; a tie-band connecting the upper surface of each of the individual trapezoidal sections, said tie-band comprising a plurality of cords embedded in an elastomeric band, said cords placed at substantially 90° of the longitudinal direction of the power transmission belt, said cords individually having a heat shrinkage factor of less than 1.0% and having a thermal force per unit inch of tie-band of not greater than 20 pounds at 300° and having an extensibility of at least 1% when subjected to a lateral force of 100 pounds per linear inch of the lateral edge of the tie-band.

8. In the combination of a rib and groove transmission belt and a groove and rib sheave over which the belt is trained with the sheave having grooves and ribs corresponding and mating with the ribs and grooves of the belt; the belt comprising a tie-band connecting the top surface of each of the ribs of the belt, said tie-band comprising a plurality of cords embedded in an elastomeric band, said cords running transversely from the longitudinal direction of the belt and said cords having a heat shrinkage of less than 1.0% and having an extensibility of at least 1% when subjected to a lateral force of 100 pounds per linear inch of edge of cord; a convex upper surface between each groove and on the upper surface of each rib; a vertical flat portion extending from the top of the tie-band between the ribs and terminating into the groove of each rib.

9. In combination with a driving and a driven sheave rotatable about substantially parallel shafts, said sheaves providing a plurality of sets of aligned V-grooves: a plurality of separate trapezoidal sections mating within said sheave grooves, said trapezoidal sections connected along the top surface of each belt with a tie-band comprising a plurality of cords embedded in an elastomeric band, said cords substantially parallel to the shafts holding said sheaves, said cords having an extensibility of at least 1% in a lateral direction when subjected to a lateral force of 100 pounds per linear inch along a lateral edge, said tie-band being relatively resilient to allow the trapezoidal sections to automatically compensate for eccentricity and dimensional irregularities of the sheaves during rotation of said sheaves, said belts separated by a vertical flat portion extending at one end from the tie-band and terminating at the other end at least in the upper portion of said belts thereby allowing sufficient clearance such that the tie-band will accommodate irregularities of different heights of the sheaves between the V-grooves.

10. A belt for cooperation with a driving and a driven sheave rotatably mounted on substantially parallel shafts, said sheaves providing a plurality of sets of aligned V-grooves wherein the improvement comprises: a plurality of separate trapezoidal sections mating within said sheave grooves, said trapezoidal sections having upper tension sections, lower compression sections and an intermediate neutral axis; a separate tie-band portion connecting the upper surfaces of said trapezoidal sections, said tie-band having physical properties of a resistance to transverse extensibility high enough to keep the belts from rotating around said sheaves independently of one another but having transverse extensibility of at least 1% when subjected to a lateral pull of 100 pounds per linear inch to allow the individual belts to seat independently in the V grooves of the sheaves.

11. A belt according to claim 10 in which the tie-band is an elastomeric material having an extensibility of at least 1% when subjected to a lateral force of 100 pounds per linear inch and having a transverse modulus less than 2,500 pounds per square inch.

12. A belt according to claim 11 in which the tie-band is a fiber loaded elastomeric material.

13. A belt according to claim 10 in which each of said trapezoidal sections is separated by vertical flat portions extending at one end from the bottom surface of said tie-band and terminating at the other end at least at the tension section of the belt.

14. A belt according to claim 13 in which the portion of the tie-band above each vertical flat portion is looped in an outer convex configuration on the upper surface of the tie-band.

15. A belt according to claim 14 having at least one resilient rib disposed between each of said looped portion of the tie-band running in a circumferential direction of the belt.

References Cited

UNITED STATES PATENTS

| 1,656,628 | 1/1928 | Gits | 74—234 |
| 1,729,329 | 9/1929 | Chilton. | |
| 1,777,864 | 10/1930 | Short | 74—233 |

FRED C. MATTERN, JR., *Primary Examiner.*

J. A. WONG, *Assistant Examiner.*